United States Patent
King et al.

(10) Patent No.: US 7,780,562 B2
(45) Date of Patent: *Aug. 24, 2010

(54) HYBRID VEHICLE AND METHOD OF ASSEMBLING SAME

(75) Inventors: Robert Dean King, Schenectady, NY (US); Lembit Salasoo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 229 days.

This patent is subject to a terminal disclaimer.

(21) Appl. No.: 11/328,051

(22) Filed: Jan. 9, 2006

(65) Prior Publication Data

US 2007/0161455 A1  Jul. 12, 2007

(51) Int. Cl.
*B60K 6/02* (2006.01)

(52) U.S. Cl. ......................................................... 475/5

(58) Field of Classification Search ................ 477/3; 180/65.2, 65.3; 903/903–907, 951, 915, 903/926; 475/5
See application file for complete search history.

(56) References Cited

U.S. PATENT DOCUMENTS

| | | | | |
|---|---|---|---|---|
| 4,405,029 A | * | 9/1983 | Hunt | ....................... 180/65.25 |
| 4,533,011 A | | 8/1985 | Heidemeyer et al. | |
| 4,862,009 A | | 8/1989 | King | |
| 4,926,104 A | | 5/1990 | King et al. | |
| 5,168,975 A | | 12/1992 | Bernhardt et al. | |
| 5,345,154 A | | 9/1994 | King | |
| 5,373,195 A | | 12/1994 | De Doncker et al. | |
| 5,589,743 A | | 12/1996 | King | |
| 5,678,646 A | * | 10/1997 | Fliege | ....................... 180/65.1 |
| 5,710,699 A | | 1/1998 | King et al. | |
| 5,713,425 A | | 2/1998 | Buschhaus et al. | |
| 5,722,502 A | | 3/1998 | Kubo | |
| 5,723,956 A | | 3/1998 | King et al. | |
| 5,847,470 A | * | 12/1998 | Mitchell | ....................... 290/45 |
| 5,903,449 A | | 5/1999 | Garrigan et al. | |
| 6,041,877 A | * | 3/2000 | Yamada et al. | ........... 180/65.25 |
| 6,170,587 B1 | | 1/2001 | Bullock | |
| 6,186,255 B1 | | 2/2001 | Shimasaki et al. | |

(Continued)

FOREIGN PATENT DOCUMENTS

EP   1577139   9/2005

(Continued)

OTHER PUBLICATIONS

PCT/US2006/049096 Search Report dated Jul. 13, 2007.

*Primary Examiner*—Sherry Estremsky
(74) *Attorney, Agent, or Firm*—Ann M. Agosti (57) ABSTRACT

A parallel hybrid vehicle includes a heat engine, a transmission including an input and output, and an electrical device. The transmission input is coupled to the engine and the transmission output is coupled to the electrical device such that substantially all of the torque generated by the heat engine is channeled through the transmission to the electrical device, and a differential, the electrical device coupled to the differential such that during a first mode of operation the electrical device functions as a motor to receive substantially all the torque generated by the engine through the transmission, and such that during a second mode of operation the electric device functions as a generator to receive substantially all the torque generated by the vehicle through the differential.

14 Claims, 6 Drawing Sheets

U.S. PATENT DOCUMENTS

| | | | |
|---|---|---|---|
| 6,227,997 | B1 | 5/2001 | Fujisawa et al. |
| 6,258,006 | B1 | 7/2001 | Hanyu et al. |
| 6,319,168 | B1 | 11/2001 | Morris et al. |
| 6,331,365 | B1 | 12/2001 | King |
| 6,332,257 | B1 | 12/2001 | Reed, Jr. et al. |
| 6,360,834 | B1 | 3/2002 | Gauthier |
| 6,401,850 | B1 | 6/2002 | Bowen |
| 6,427,793 | B1 * | 8/2002 | Hanada et al. ........... 180/65.25 |
| 6,441,581 | B1 | 8/2002 | King et al. |
| 6,478,705 | B1 | 11/2002 | Holmes et al. |
| 6,481,517 | B1 | 11/2002 | Kobayashi et al. |
| 6,486,568 | B1 | 11/2002 | King et al. |
| 6,507,128 | B2 | 1/2003 | King et al. |
| 6,533,692 | B1 | 3/2003 | Bowen |
| 6,533,693 | B2 | 3/2003 | Bowen et al. |
| 6,554,088 | B2 * | 4/2003 | Severinsky et al. ....... 180/65.23 |
| 6,569,055 | B2 | 5/2003 | Urasawa et al. |
| 6,592,484 | B1 | 7/2003 | Tsai et al. |
| 6,603,215 | B2 | 8/2003 | Kuang et al. |
| 6,604,591 | B2 | 8/2003 | Bowen et al. |
| 6,645,105 | B2 | 11/2003 | Kima |
| 6,679,799 | B2 | 1/2004 | Bowen |
| 6,712,165 | B1 * | 3/2004 | Okazaki .................. 180/65.21 |
| 6,729,423 | B2 | 5/2004 | Kobayashi et al. |
| 6,737,822 | B2 | 5/2004 | King |
| 6,784,563 | B2 | 8/2004 | Nada |
| 6,817,432 | B2 | 11/2004 | Kitada et al. |
| 6,837,816 | B2 | 1/2005 | Tsai et al. |
| 6,890,284 | B2 * | 5/2005 | Sakamoto et al. ........... 477/109 |
| 6,915,220 | B2 | 7/2005 | Cardinal et al. |
| 7,277,782 | B2 * | 10/2007 | Yakes et al. .................... 701/22 |
| 2002/0082134 | A1 * | 6/2002 | Hirt et al. ...................... 477/3 |
| 2003/0085577 | A1 | 5/2003 | Takaoka et al. |
| 2004/0116231 | A1 * | 6/2004 | Porter ........................ 475/198 |
| 2004/0173393 | A1 * | 9/2004 | Man et al. .................. 180/65.2 |
| 2005/0205313 | A1 * | 9/2005 | Gilmore et al. ............ 180/65.2 |
| 2006/0000650 | A1 | 1/2006 | Hughey |
| 2006/0030450 | A1 * | 2/2006 | Kyle ............................. 477/3 |
| 2007/0169970 | A1 * | 7/2007 | Kydd ........................ 180/65.2 |
| 2009/0321156 | A1 * | 12/2009 | Perkins ...................... 180/65.7 |

FOREIGN PATENT DOCUMENTS

| | | |
|---|---|---|
| GB | 2305643 | 4/1997 |

* cited by examiner

HYBRID VEHICLE AND METHOD OF ASSEMBLING SAME

BACKGROUND OF THE INVENTION

This invention relates generally to a vehicle, and more specifically to a hybrid vehicle, and a method of retrofitting a known vehicle to achieve a hybrid vehicle.

Figure 1:
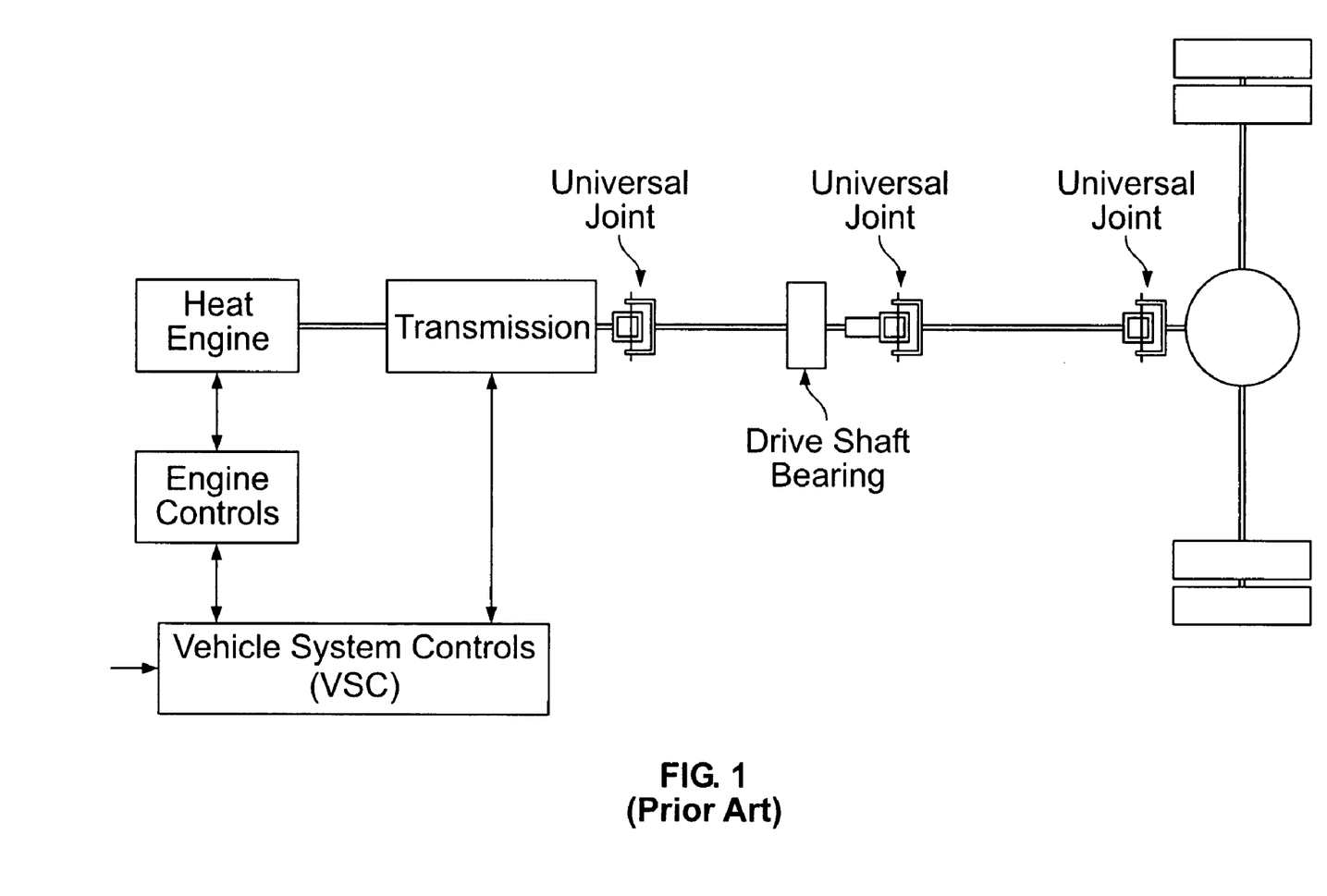
FIG. 1 illustrates a prior art power train used with a conventional vehicle.
Figure 2:
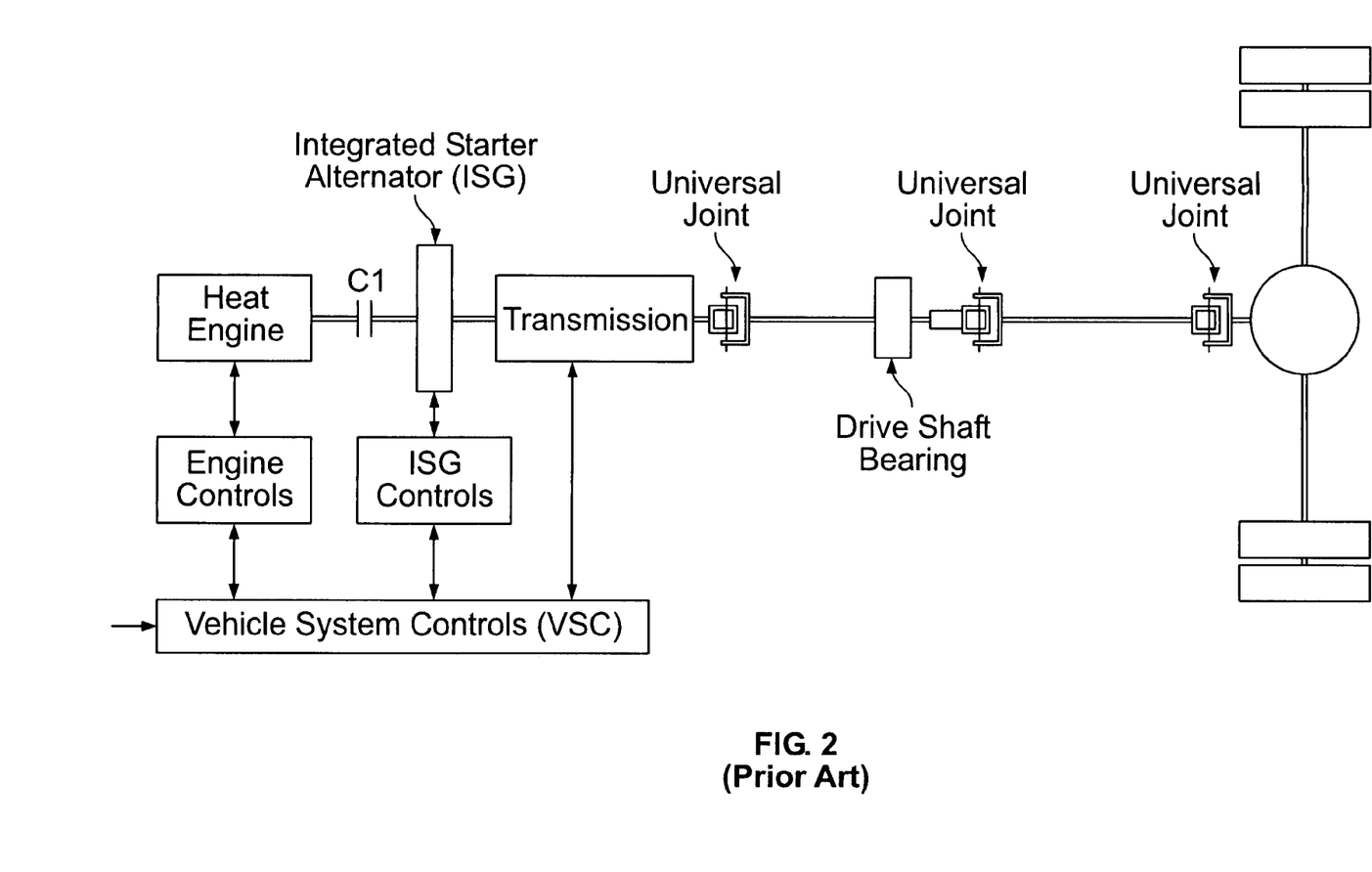
FIG. 2 illustrates a prior art power train used with a conventional hybrid.

FIG. 1 illustrates a known power train for a conventional vehicle, such as may be used in a Heavy Duty Truck or Bus. FIG. 2 illustrates a parallel hybrid vehicle that includes a known electric drive system that is coupled between an engine and a transmission. The electric drive system in this configuration is often referred to as an Integral Starter Alternator (ISG) or Mild Hybrid, and provides the functions of engine cranking, supplying electrical torque during the vehicle launch acceleration and hill climbing, and may also be used as an alternator to charge the vehicle Starting Lighting, and Ignition (SLI) battery.

As known, hybrid vehicles offer many advantages the foremost being fuel efficiency. However, hybrid vehicles also include additional components such as the electric drive system described above that works in combination with the engine to achieve the fuel efficiency. Because of the increased complexity of known hybrid vehicles, the vehicles are originally manufactured such that the electric drive system is formed integrally with the engine system. Specifically, during manufacture, the electric drive system of at least one known hybrid vehicle is coupled between the engine and transmission to produce a hybrid vehicle.

Therefore, it may be cost prohibitive and space limited to modify a conventional vehicle to include an electric drive system that is coupled between the engine and transmission. As a result, conventional vehicles may not achieve the fuel efficiency of a hybrid vehicle and thus may also not benefit from the reduced costs of operating the vehicle.

BRIEF DESCRIPTION OF THE INVENTION

In one aspect, a vehicle is provided. The vehicle includes a heat engine, a transmission including an input and an output, and an electrical device. The transmission input is coupled to the engine and the transmission output is coupled to the electrical device such that substantially all of the torque generated by the heat engine is channeled through the transmission to the electrical device, and a differential, the electrical device coupled to the differential such that during a first mode of operation the electrical device functions as a motor to receive substantially all the torque generated by the engine through the transmission, the transmission output torque is summed with the torque produced by the electric motor and transmitted to the differential and such that during a second mode of operation the electrical device functions as a generator to receive substantially all the torque generated by the vehicle through the differential.

In another aspect, a method of retrofitting a vehicle is provided. The vehicle includes a heat engine, a transmission coupled to the engine, a differential, and at least one drive shaft coupled between the transmission and the differential. The method includes removing the at least one drive shaft, and coupling an electric motor between the engine and the differential such that the electric motor receives substantially all of the torque generated by the engine and such that the differential receives substantially all the torque generated by the engine and the electric motor.

DETAILED DESCRIPTION OF THE INVENTION

Figure 3:
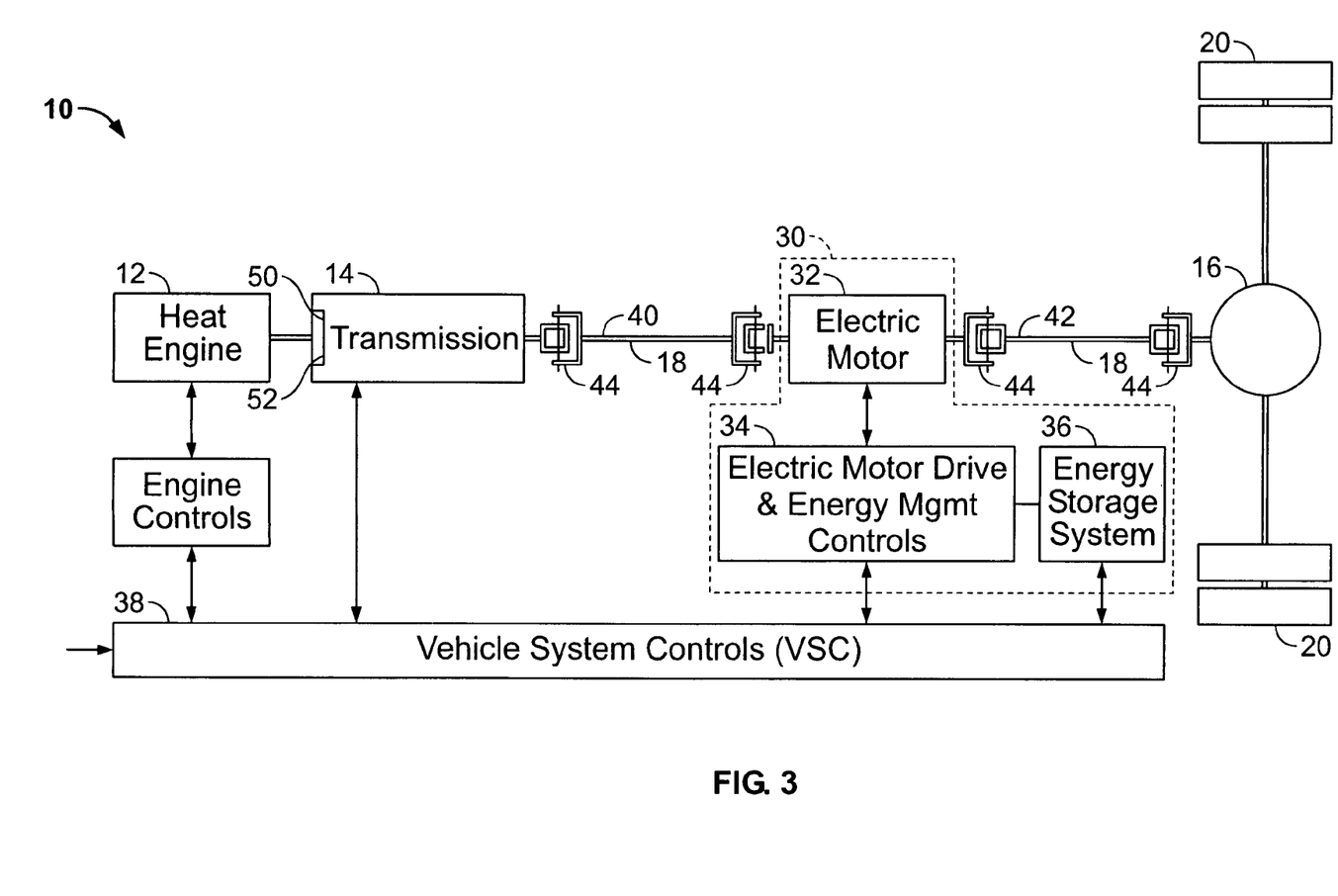
FIG. 3 is a schematic illustration of an exemplary hybrid vehicle.

FIG. 3 illustrates a parallel hybrid vehicle 10, such as a heavy duty truck for example. Vehicle as used herein represents any of a broad class of apparatuses that may be utilized to move an operator from a first location to a second location, and may include for example, trucks, buses, automobiles, off-road vehicles, etc. Vehicle 10 includes a heat engine 12, a transmission 14 that is coupled to the engine 12, a differential 16, and at least one drive shaft 18 that is coupled between the transmission 14 and the differential 16. The vehicle 10 also includes at least two wheels 20 that are coupled to respective ends of the differential 16. In one embodiment, vehicle 10 is configured as a rear wheel drive vehicle such that the differential is positioned near the aft end of vehicle 10 and therefore configured to drive at least one of the wheels 20. Optionally, vehicle 10 is configured as a front wheel drive vehicle.

In the exemplary embodiment, heat engine 12 may be implemented using at least one of an internal combustion gasoline engine, an internal combustion diesel engine, an external combustion engine, and a gas turbine engine.

As shown in FIG. 3, vehicle 10 also includes a hybrid drive system 30 that includes at least one electrical device such as an electric motor/generator 32 that is coupled between transmission 14 and differential 16, an Electric Motor Drive and Energy Management Controls System (EMDEMCS) 34 that is electrically coupled to motor/generator 32, an energy storage system 36 that is coupled to the EMDEMCS 34, and a Vehicle System Controls (VSC) section 38 that is coupled to both the EMDEMCS 34, and the energy storage system 36. In the exemplary embodiment, the energy storage system comprises a plurality of batteries such as, but not limited to, sodium nickel chloride batteries, sodium sulfur batteries, a fuel cell, nickel metal hydride batteries, lithium ion batteries, lithium polymer batteries, nickel cadmium batteries, and/or lead acid batteries that are coupled together in a serial or parallel arrangement.

In one embodiment, the electric motor/generator 32 is coupled directly to transmission 14, and vehicle 10 includes at least one drive shaft 18 to couple the motor/generator 32 to the differential 16. In another embodiment, the electric motor/generator 32 is coupled directly to the differential 16, and vehicle 10 includes at least one drive shaft 18 to couple the motor/generator 32 to the transmission 14. In the exemplary embodiment, illustrated in FIG. 3, vehicle 10 includes a first drive shaft 40, a, second drive shaft 42, and a plurality of universal joints 44 to facilitate coupling motor/generator 32 between transmission 14 and differential 16.

Specifically, the first drive shaft 40 is coupled between the transmission 14 and the motor/generator 32 using at least two universal joints 44, and the second drive shaft 42 is coupled between the motor/generator 32 and the differential using at least two universal joints 44. As such, when the vehicle is operating in a first mode the electrical device 32 functions as a motor to receive substantially all the torque generated by the engine 12 through the transmission 14, the transmission output torque is summed with the torque produced by the electric motor and transmitted to the differential and such that during a second mode of operation the electrical device 32 functions as a generator to receive substantially all the torque generated by the vehicle 10 through the differential 16. The phrase substantially all the torque, as used herein, represents the nominal torque that is generated by the engine or transmission without representing minor mechanical or electrical losses that occur in a typical system. For example, internal losses caused by bearings, friction, or etc.

Moreover, although the exemplary embodiment illustrates a vehicle that includes the electrical device 32 coupled between the transmission 14 and the differential 16, it should be realized that vehicle 10 may include a single wheeled axle for example that replaces differential 16. Accordingly, the electrical device 32 in the exemplary embodiment, is coupled between the driving portion, i.e. engine 12 coupled to the transmission 14 and the driven portion, i.e. differential 16 or a simple axle. Optionally, electrical device 32 includes a clutch (not shown) that may be utilized to decouple a portion of the electrical device 32 from the drivetrain during selected driving conditions. For example, when vehicle 10 is operating on a freeway for example, an operator may choose to declutch the electrical device 32 from the drive train to facilitate optimizing fuel efficiency. As such, the electrical device 32 may include a rotor shaft such that the electrical device 32 is still configured to transmit torque from the transmission 14 to the differential 16 as shown.

In one embodiment, transmission 14 is a manually operated transmission that includes a plurality of gears such that the input torque received from engine 12 is multiplied using the gear ratio(s) and transmitted to the electrical device 32. As such, the manual transmission includes a clutch 50. In another embodiment, transmission 14 is an automatic transmission having one or more discrete gear ratios and as such may include a torque converter 52. Optionally, transmission 14 is an automatically shifted manual transmission and includes clutch 50. In the exemplary embodiment, the automatic transmission has continuously variable gear ratios that vary between approximately 0.5 to 1 and approximately 5.0 to 1.

In the exemplary embodiment, system 30 performs at least some of the functions as the conventional ISG configuration shown in FIG. 2 including, but not limited to, providing additional boost torque and power to the mechanical powertrain during vehicle acceleration, and also provides a retarding torque and power during vehicle deceleration and while holding speed on a down-hill grade.

Figure 4:
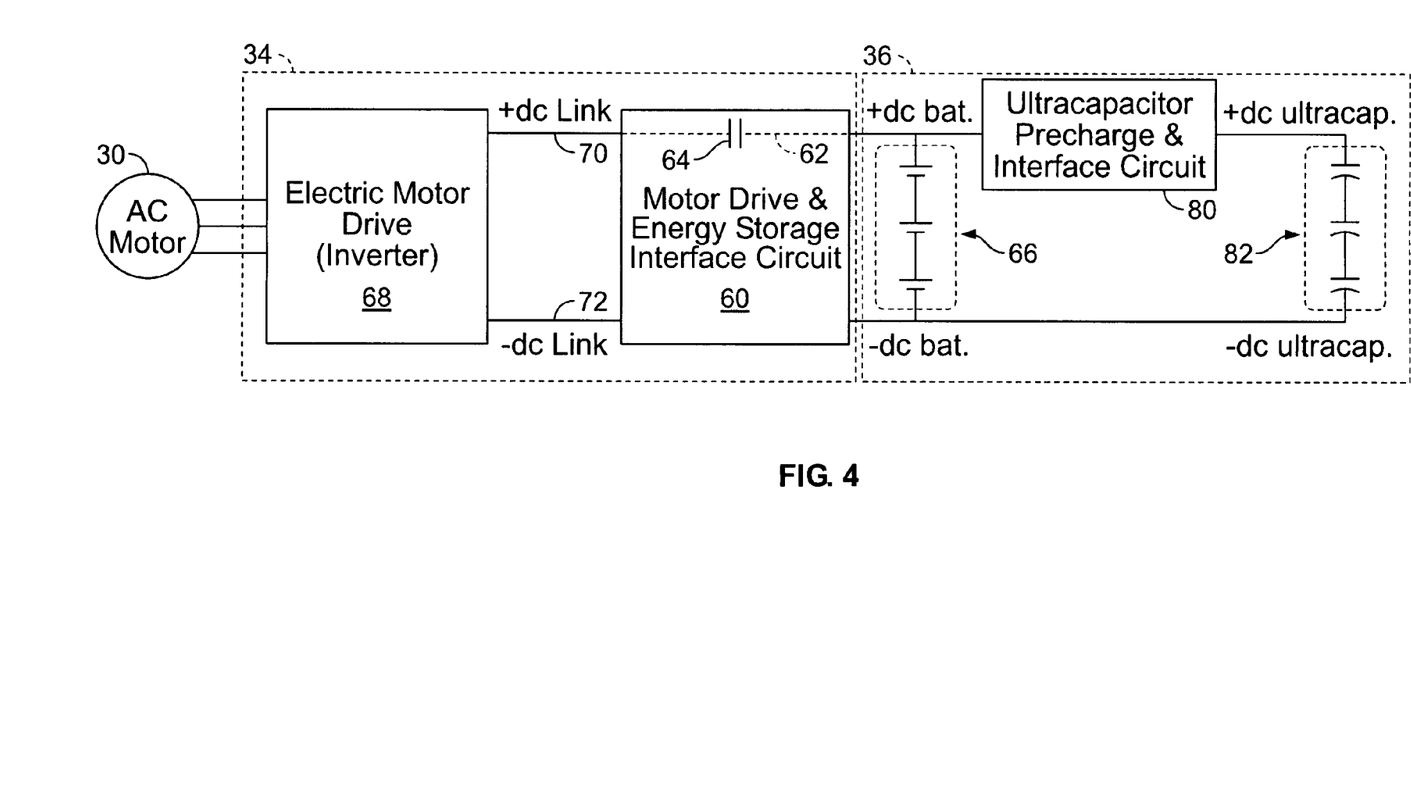
FIG. 4 is a simplified schematic illustration of control system shown in FIG. 3.

FIG. 4 is a simplified schematic illustration of the EMDEMCS 34 and the energy storage system 36 shown in FIG. 3. In one embodiment, the EMDEMCS includes a relatively low cost Energy Storage Interface (ESI) circuit 60 that includes a power cable 62 and at least one power contactor 64 such that a first energy storage unit 66 voltage is direct electrically connected to an input of a DC-AC inverter 68. Specifically, first energy storage unit 66 is connected to circuit 60 which is electrically connected to a variable frequency controlled inverter such as electric motor drive inverter 68, via a positive DC link 70 and a negative DC link 72, to facilitate controlling the power to motor 30.

The EMDEMCS also includes a precharge and interface circuit 80 and a second storage unit 82 that is coupled to the precharge and interface circuit 80. In the exemplary embodiment, the second storage unit 82 is an ultracapacitor. Ultracapacitor as used herein represents a capacitor that has a cell capacitance that is greater than 100 Farads. In the exemplary embodiment, the ultracapacitors described herein have a cell capacitance that is greater than 1000 Farads. The ultracapacitor 82 includes a plurality of ultracapacitor cells that are coupled together in at least one of a series arrangement to achieve increased voltage or a parallel arrangement to achieve increased current capability.

Figure 5:
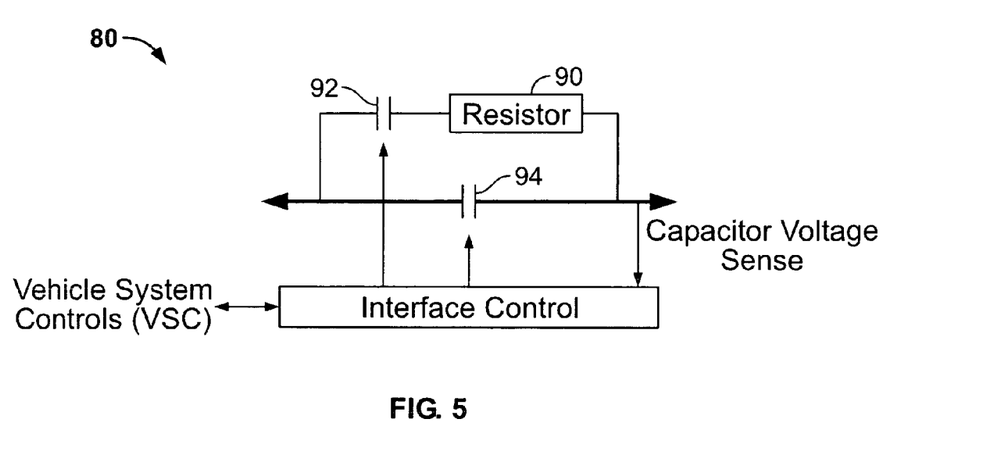
FIG. 5 is a simple schematic illustration of a portion of the control system shown in FIG. 3.

FIG. 5 is a simple schematic illustration of a first embodiment of precharge and interface circuit 80. As shown in FIG. 5, circuit 80 includes a pre-charge resistor 90 and a pre-charge contactor 92 that are coupled in parallel with a main contactor 94. During operation, the main contactor 94 is enabled or closed when the interface control circuit 80 detects that the voltage difference across the main contactor 94 is at or below a determined voltage value. Optionally, the main contactor 94 is closed after the pre-charge contactor 92 has been closed for a determined length of time. In both of the above pre-charge embodiments, after the main contactor 94 is closed, the interface control circuit 80 commands the pre-charge contactor 92 to open.

Figure 6:
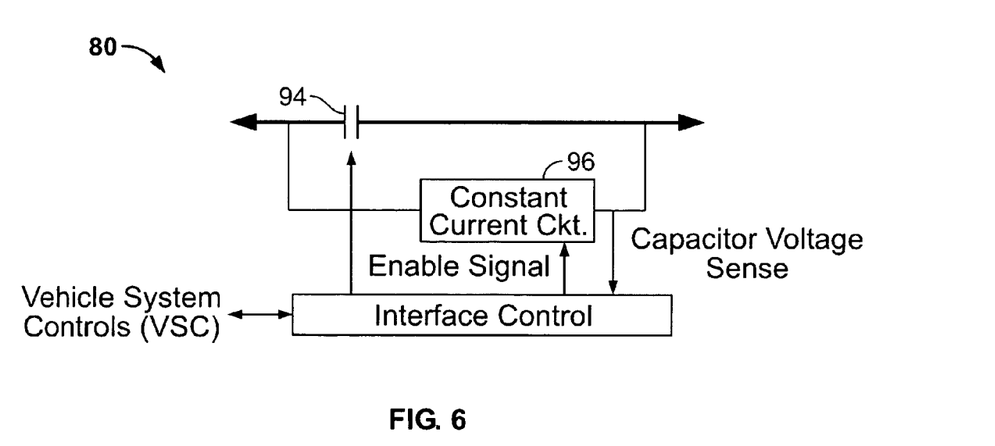
FIG. 6 is a simple schematic illustration of a portion of the control system shown in FIG. 3.

FIG. 6 is a simple schematic illustration of a second embodiment of precharge and interface circuit 80. As shown in FIG. 6, circuit 80 includes the main contactor 94 and a constant current circuit 96 that is coupled in parallel with main contactor 94. Optionally, the voltage of the first energy storage 66 is decoupled from the DC input of the inverter 68 using the concept described in U.S. Pat. No. 5,373,195.

During operation, after the initial vehicle startup, the ultracapacitor 82 and the first energy storage unit 66, e.g. a battery, are electrically connected via the main contactor 94. During a first mode of operation when the vehicle is accelerating, power is supplied to the electric motor drive inverter 68 and thus the electrical device functioning as the motor 30 by a combination of both energy storage units 66 and 82 coupled in a substantially parallel arrangement. The power split between the two energy storage units 66 and 82 is determined by the battery's open circuit voltage and associated internal resistance, while the ultracapacitor voltage is determined by the ultracapacitor's open circuit voltage and it's corresponding effective series resistance (ESR). After the vehicle acceleration is complete, the first energy storage unit 66 partially charges the ultracapacitor 82.

Moreover, during a second mode of operation when the vehicle is decelerating, or holding speed on a downhill grade, the motor 30 is controlled to function as a generator such that power flows from the vehicle's drive wheels 20 through the differential 16 to drive the electrical device 32 that is now functioning as a generator, and the inverter 68 to facilitate charging both the first energy storage unit 66 and also the ultracapacitor 82.

Figure 7:
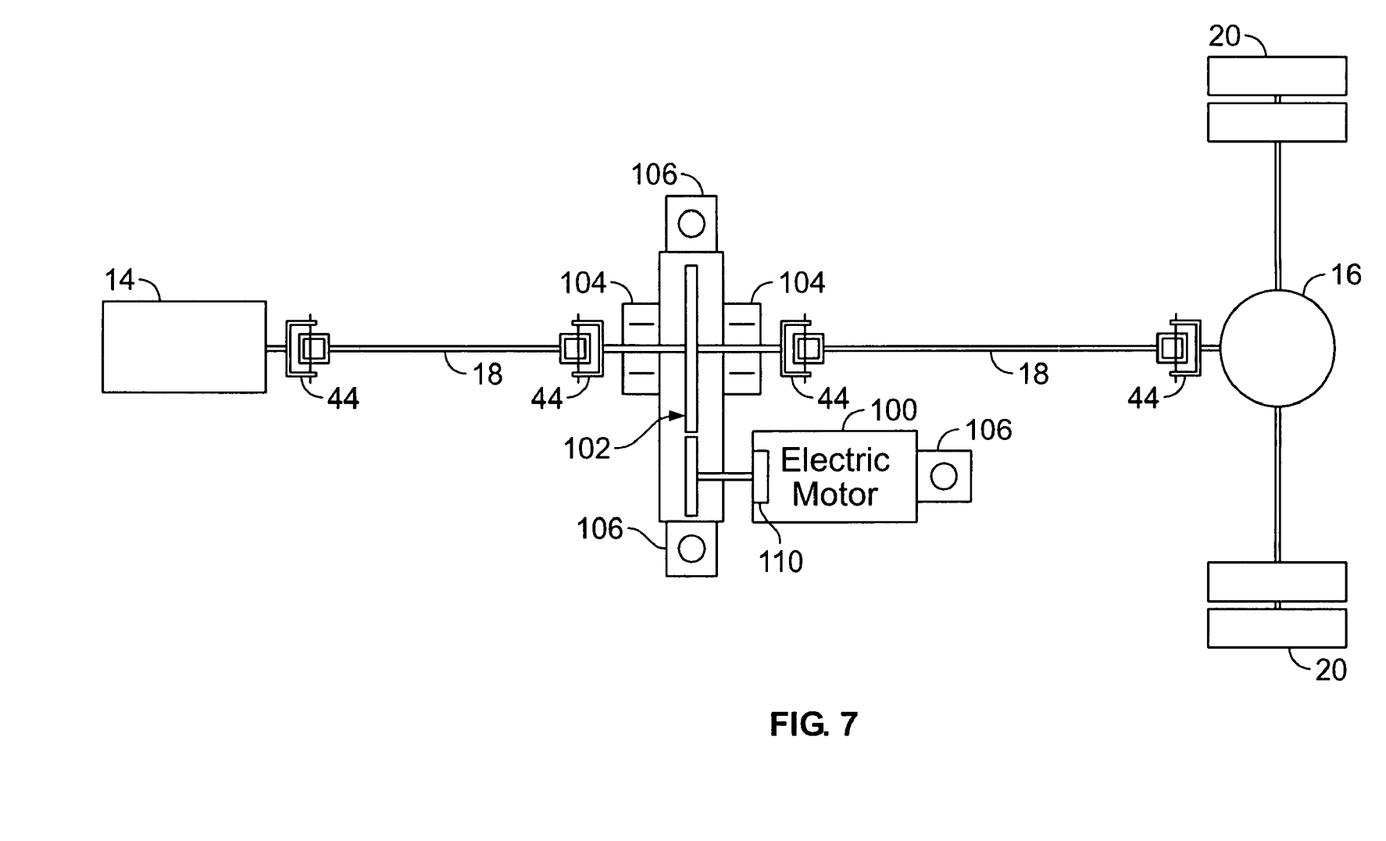
FIG. 7 illustrates an alternative method of coupling a motor/generator to the vehicle shown in FIG. 3.

FIG. 7 illustrates an alternative method of coupling a motor/generator to the vehicle. As shown in FIG. 7, the vehicle 10 includes a relatively high-speed low-torque traction motor 100 that is coupled to drive shaft 18 using a gear reduction unit 102. In the exemplary embodiment, the gear reduction unit 102 is rotatably coupled to drive shaft 18 using a plurality of bearings 104. Additionally, high-speed low-torque traction motor 100 and the gear reduction unit 102 are coupled to a portion of the vehicle chassis using a plurality of motor mounts 106 to facilitate securing both the high-speed low-torque traction motor 100 and the gear reduction unit 102 in a substantially fixed position relative to the chassis. Optionally, the high-speed low-torque traction motor 100 is coupled to drive shaft 18 using at least one of fixed ratio gear assembly, a chain drive, or a belt drive, such that the electrical device is operable at a relatively high torque and at a relatively slower rotational speed to facilitate achieving approximately the same mechanical ratio as the that achieved using the gear assembly 102. Moreover, the vehicle 10 may include a clutch 110 coupled between the electric motor 100 and the gear reduction unit 102 to facilitate reducing losses within the motor 100 when the inverter 68 is disabled.

Optionally, electrical device 100 includes a clutch 110 that may be utilized to decouple a portion of the electrical device 32 from the drivetrain during selected driving conditions. For example, when vehicle 10 is operating on a freeway for example, an operator or associated controls may choose to declutch the electrical device 100 from the drive train to facilitate optimizing fuel efficiency.

In either embodiment shown in FIGS. 4 or 7, the exemplary traction motor 30 is selected such that the motor 30 exhibits low drag during operation when the electric excitation, i.e. inverter 68 is disabled. For example, motor 30 may be an induction motor or a switched reluctance motor. Moreover, motor 30 may also be a Permnanent Magnet (PM) motor with an optional clutch 110 shown in FIG. 7.

In the exemplary embodiment, hybrid system 30 may be retrofitted on a known vehicle to facilitate increasing the performance of the vehicle. For example, to install hybrid system 30 on a known vehicle, at least one drive shaft that is coupled between the transmission and the differential is removed. The electrical device is then coupled between the transmission and the differential such that the electrical motor receives substantially all of the torque generated by the engine and transmission, the transmission output torque is summed with the torque produced by the electric motor and transmitted to the differential in a first operational mode described above, and such that the motor receives substantially all of the torque generated by the vehicle through the differential in a second operational mode.

Described herein is a hybrid vehicle that includes a system including an electrical device such as a motor/generator that is coupled between a vehicle transmission and a differential. The system is capable of operating in at least three modes of operation: Heat Engine Vehicle Operating Mode, where the electric motor drive system is disabled by the VSC; a Hybrid Vehicle Operating Mode, where the VSC enables both the Heat Engine and Electric Drive System; and Zero Emission Vehicle (ZEV), Electric Vehicle Operating Mode, where the VSC either disables the Heat Engine or commands the Heat Engine to be operated at a low power idle mode, commands the transmission to be in a neutral gear, and enables the Electric Drive system to allow the vehicle to operate under reduced performance and over a limited range (limp home mode) using the energy from the energy storage unit.

An additional feature is the commonality of the electric drive system for a smaller vehicle platform all-electric propelled vehicles, i.e. small delivery vehicle or school bus, with a parallel hybrid implementation of larger vehicles (transit bus or large package delivery, beverage delivery vehicles, and refuse trucks).

As such, the system described herein provides improved system efficiency by improving fuel efficiency and reducing emissions compared to other known conventional vehicles. The system may also be retrofitted on existing conventional mechanically driven trucks, buses, or other vehicles. The system provides improved fuel economy and emission reduction from increased round trip efficiency of the electric drive system and higher levels of regenerative brake capture as compared to known hybrid vehicles, primarily due to the elimination of the roundtrip losses through the transmission for the electric drive subsystem, and the implementation cost of the electric drive system, energy storage system, and associated energy management controls is reduced While the invention has been described in terms of various specific embodiments, those skilled in the art will recognize that the invention can be practiced with modification within the spirit and scope of the claims.

What is claimed is:

1. A vehicle, comprising:
   one or more drive shafts disposed between a heat engine and a differential, wherein a first drive shaft is configured to couple a gear reduction unit and an electrical device via at least two universal joints such that substantially all of the torque generated by the heat engine is channeled through the gear reduction unit to the electrical device; and
   a second drive shaft configured to couple the electrical device and the differential via at least two additional universal joints.

2. A vehicle in accordance with claim 1 wherein said engine comprises at least one of an internal combustion gasoline engine, an internal combustion diesel engine, an external combustion engine, and a gas turbine engine.

3. A vehicle in accordance with claim 1 wherein said gear reduction unit comprises an automatically shifting manual transmission.

4. A vehicle in accordance with claim 1 wherein said gear reduction unit comprises an automatic transmission including a torque converter coupled between said engine and said automatic transmission.

5. A vehicle in accordance with claim 4 wherein said gear reduction unit comprises an automatic transmission having one or more discrete gear ratios.

6. A vehicle in accordance with claim 1 wherein said gear reduction unit comprises a manual transmission including a clutch coupled between said engine and said manual transmission.

7. A vehicle in accordance with claim 1 further comprising at least two wheels coupled to said gear reduction unit.

8. A vehicle in accordance with claim 1 further comprising a control system coupled to said electrical device, said control system comprising:
   an energy storage system; and
   a vehicle system control (VSC) system coupled to said electrical device and said energy storage system, said vehicle system control system configured to operate the vehicle in at least one of a heat engine vehicle operating mode, a hybrid vehicle operating mode, and an electric vehicle operating mode.

9. A vehicle in accordance with claim 8 wherein said electrical device receives energy from said energy storage system when operating in a first mode.

10. A vehicle in accordance with claim 8 wherein said electrical device can charge the energy storage system when operating in a second mode.

11. A vehicle in accordance with claim 8 wherein said energy storage system comprises at least one battery and at least one ultracapacitor.

12. A vehicle in accordance with claim 11 further comprising a precharge and interface circuit that is coupled between said at least one battery and said at least one ultracapacitor and configured to channel energy from the ultracapacitor to the electrical device in a first mode of operation, and channel energy from the electrical device to the ultracapacitor in a second mode of operation.

13. The vehicle as defined in claim 1, further comprising a motor mount that secures the electrical device in a substantially fixed position relative to the chassis.

14. The vehicle as defined in claim 1, further comprising a clutch coupled between the electrical device and the gear reduction unit, and thereby to facilitate reducing losses within the electrical device.

* * * * *